United States Patent
Wang

(10) Patent No.: US 9,681,369 B2
(45) Date of Patent: Jun. 13, 2017

(54) METHODS AND DEVICES FOR CELL MEASUREMENT AND MEASUREMENT CONTROL

(71) Applicant: Huawei Technologies Co., Ltd., Shenzhen, Guangdong (CN)

(72) Inventor: Shukun Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 50 days.

(21) Appl. No.: 14/173,546

(22) Filed: Feb. 5, 2014

(65) Prior Publication Data

US 2014/0155076 A1 Jun. 5, 2014

Related U.S. Application Data

(63) Continuation of application No. PCT/CN2012/079740, filed on Aug. 6, 2012.

(30) Foreign Application Priority Data

Aug. 5, 2011 (CN) .......................... 2011 1 0223729

(51) Int. Cl.
*H04W 72/00* (2009.01)
*H04W 48/18* (2009.01)
(Continued)

(52) U.S. Cl.
CPC ........... *H04W 48/18* (2013.01); *H04W 24/10* (2013.01); *H04W 48/12* (2013.01); *H04W 48/20* (2013.01)

(58) Field of Classification Search
CPC ..... H04W 48/12; H04W 48/18; H04W 48/20; H04W 24/10; H04W 36/0061; H04W 36/0083
(Continued)

(56) References Cited

U.S. PATENT DOCUMENTS 8,538,410 B2 * 9/2013 Karim ................... H04W 28/16
455/26.1
8,868,063 B2 * 10/2014 Wang et al. .................. 455/423
(Continued)

FOREIGN PATENT DOCUMENTS

CN 1466399 A 1/2004
CN 101217792 A 7/2008
(Continued)

OTHER PUBLICATIONS

"3GPP TS 36.331—$3^{rd}$ Generation Partnership Project; Technical Specification Group Radio Access Network; Evolved Universal Terrestrial Radio Access (E-UTRA); Radio Resource Control (RRC); Protocol specification (Release 10)," Version 10.2.0, $3^{rd}$ Generation Partnership Project, Valbonne, France (Jun. 2011).

*Primary Examiner* — Wayne Cai
(74) *Attorney, Agent, or Firm* — Leydig, Voit & Mayer, Ltd.

(57) ABSTRACT

Embodiments of the present invention provide methods and devices for cell measurement and measurement control. In the embodiments of the present invention, the base station may provide the information of the neighboring micro cell to the UE, so that the UE may identify that the neighboring cell of the serving cell includes a micro cell, and ignore the measurement starting condition when performing measurement on the micro cell, so as to timely complete measurement on the neighboring micro cell and be handed over to the neighboring micro cell to be served, thereby improving an effect of load sharing of the micro cell.

21 Claims, 7 Drawing Sheets

(51) Int. Cl.
*H04W 48/12* (2009.01)
*H04W 24/10* (2009.01)
*H04W 48/20* (2009.01)

(58) Field of Classification Search
USPC .................................................. 455/450, 444
See application file for complete search history.

(56) References Cited

U.S. PATENT DOCUMENTS

| | | | |
|---|---|---|---|
| 2007/0111741 A1* | 5/2007 | Roberts .......................... | 455/515 |
| 2009/0047968 A1 | 2/2009 | Gunnarsson et al. | |
| 2009/0052395 A1* | 2/2009 | Bao et al. ...................... | 370/331 |
| 2009/0191862 A1* | 7/2009 | Amirijoo et al. .............. | 455/424 |
| 2009/0238117 A1* | 9/2009 | Somasundaram et al. ... | 370/328 |
| 2009/0239533 A1* | 9/2009 | Somasundaram et al. ... | 455/434 |
| 2009/0247170 A1 | 10/2009 | Balasubramanian et al. | |
| 2009/0270096 A1* | 10/2009 | Somasundaram et al. ... | 455/434 |
| 2009/0316595 A1* | 12/2009 | Kwon et al. ................... | 370/252 |
| 2010/0034126 A1* | 2/2010 | Kitazoe et al. ................ | 370/310 |
| 2010/0111035 A1* | 5/2010 | Eskicioglu ............ | H04W 36/04 370/331 |
| 2010/0130202 A1* | 5/2010 | Yu ................... | 455/434 |
| 2010/0167719 A1* | 7/2010 | Sun et al. ...................... | 455/423 |
| 2010/0208707 A1 | 8/2010 | Hamabe et al. | |
| 2010/0323633 A1* | 12/2010 | Pani et al. ................. | 455/67.14 |
| 2011/0092214 A1* | 4/2011 | Iwamura ....................... | 455/438 |
| 2011/0195715 A1* | 8/2011 | Wu ................................ | 455/436 |
| 2011/0206011 A1 | 8/2011 | Ishida et al. | |
| 2011/0207456 A1* | 8/2011 | Radulescu et al. ........... | 455/434 |
| 2012/0015681 A1* | 1/2012 | Dalsgaard et al. ............ | 455/517 |
| 2012/0108199 A1* | 5/2012 | Wang et al. ................... | 455/405 |
| 2012/0184290 A1* | 7/2012 | Kazmi et al. ................ | 455/456.1 |

FOREIGN PATENT DOCUMENTS

| | | |
|---|---|---|
| CN | 101981974 A | 2/2011 |
| EP | 2166713 A1 | 3/2010 |
| WO | WO 2009107950 A2 | 9/2009 |
| WO | WO 2010050140 A1 | 5/2010 |
| WO | WO 2010093172 A2 | 8/2010 |
| WO | WO 2011085204 A1 | 7/2011 |

\* cited by examiner

METHODS AND DEVICES FOR CELL MEASUREMENT AND MEASUREMENT CONTROL

CROSS-REFERENCE TO RELATED APPLICATIONS

This application is a continuation of International Patent Application No. PCT/CN2012/079740, filed on Aug. 6, 2012, which claims priority to Chinese Patent Application No. 201110223729.1, filed on Aug. 5, 2011, both of which are hereby incorporated by reference in their entireties.

TECHNICAL FIELD

Embodiments of the present invention relate to the field of communications technologies, and in particular, to technologies of cell measurement and measurement control.

BACKGROUND

A radio communication system is capable of providing radio services such as voice and data. For example, in an LTE (Long Term Evolution, Long Term Evolution) and/or LTE-A (LTE-Advanced, Advanced Long Term Evolution) heterogeneous network, in order to satisfy performance requirements of LTE and/or LTE-A or to improve performance of LTE and/or LTE-A, base stations (for example, low-transmit-power base stations or transmit/receive nodes) of different types or different formats are deployed in a homogeneous network (homogeneous network) to enhance network coverage and performance, where such a network structure is referred to as a heterogeneous network (Heterogeneous network). For example, a low-transmit-power base station (lower power node, LPN) such as a micro base station (for example, a Pico base station) and a home base station (HeNB) may be deployed within a coverage range of a high-transmit-power Macro eNB (macro base station). In an LTE heterogeneous network, the LPN generally is used to enhance network coverage and performance. Therefore, the LPN should share load of the network as much as possible (offload). That is, a UE should be handed over to an LPN cell to be served as much as possible.

However, the UE cannot distinguish a cell of the macro base station (macro cell) from some LPN cells (for example, Pico cells), or cannot identify all LPN cells. In a case where the UE cannot distinguish or identify the LPN cell and the macro cell, the UE cannot timely perform measurement on the LPN cell, and therefore cannot be timely handed over to the LPN cell to be served.

SUMMARY

One aspect of the present invention provides a measurement method, including: receiving, by a user equipment, information of a neighboring micro cell, and learning that a neighboring cell of a serving cell of the user equipment includes a micro cell according to the information of the neighboring micro cell; and ignoring, by the user equipment, a measurement starting condition when performing measurement on the micro cell.

Another aspect of the present invention provides a measurement control method, including: sending, by a base station, information of a neighboring micro cell to a user equipment, so that the user equipment learns that a neighboring cell of a serving cell of the user equipment includes a micro cell according to the information of the neighboring micro cell, and the user equipment ignores a measurement starting condition when performing measurement on the micro cell.

Another aspect of the present invention provides a measurement method, including: receiving, by a user equipment, measurement configuration information sent by a base station, where the measurement configuration information includes a measurement identifier and indication information corresponding to the measurement identifier; and if the indication information indicates ignoring a measurement starting condition, ignoring, by the user equipment, the measurement starting condition when performing measurement on a neighboring cell corresponding to the measurement identifier.

Another aspect of the present invention provides a measurement control method, including: sending measurement configuration information to a user equipment, where the measurement configuration information includes a measurement identifier and indication information corresponding to the measurement identifier; and if neighboring cell measurement corresponding to the measurement identifier is performed on a neighboring micro cell, configuring the indication information corresponding to the measurement identifier to be: ignoring a measurement starting condition.

Another aspect of the present invention provides a user equipment, including: a receiving unit, configured to receive information of a neighboring micro cell, and learn that a neighboring cell of a serving cell of the user equipment includes a micro cell according to the information of the neighboring micro cell; and a measuring unit, configured to ignore a measurement starting condition when performing measurement on the micro cell.

Another aspect of the present invention provides a base station, including: a generating unit, configured to generate information of a neighboring micro cell; and a sending unit, configured to send the information of the neighboring micro cell to a user equipment, so that the user equipment learns that a neighboring cell of a serving cell of the user equipment includes a micro cell according to the information of the neighboring micro cell, and the user equipment ignores a measurement starting condition when performing measurement on the micro cell.

Another aspect of the present invention provides a user equipment, including: a receiving unit, configured to receive measurement configuration information sent by a base station, where the measurement configuration information includes a measurement identifier and indication information corresponding to the measurement identifier; and a measuring unit, configured to: if the indication information indicates ignoring a measurement starting condition, ignore the measurement starting condition when performing measurement on a neighboring cell corresponding to the measurement identifier.

Another aspect of the present invention provides a base station, including: a sending unit, configured to send measurement configuration information to a user equipment, where the measurement configuration information includes a measurement identifier and indication information corresponding to the measurement identifier; and a configuring unit, configured to: if neighboring cell measurement corresponding to the measurement identifier is performed on a neighboring micro cell, configure the indication information corresponding to the measurement identifier to be: ignoring a measurement starting condition.

In embodiments of the present invention, the base station may provide to the UE information indicating that a neighboring cell of a current serving cell includes a neighboring micro cell, so that the UE may identify that the neighboring cell of the serving cell includes a micro cell, so as to timely complete measurement on the neighboring micro cell and be handed over to the neighboring micro cell to be served, thereby improving an effect of load sharing of the micro cell.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
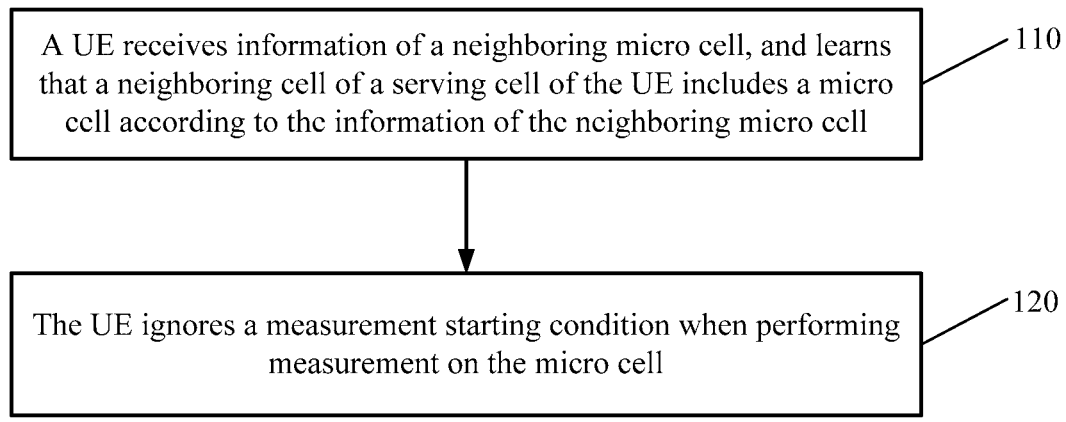
FIG. 1 is a schematic flowchart of a cell measurement method according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that the technical solutions of the present invention are applicable to a variety of communication systems, for example, a Global System for Mobile Communications (GSM, Global System of Mobile communication) system, a Code Division Multiple Access (CDMA, Code Division Multiple Access) system, a Wideband Code Division Multiple Access (WCDMA, Wideband Code Division Multiple Access) system, a General Packet Radio Service (GPRS, General Packet Radio Service), a Long Term Evolution (LTE, Long Term Evolution) system, a Long Term Evolution Advanced (LTE-A, Advanced long term evolution) system, a Universal Mobile Telecommunication System (UMTS, Universal Mobile Telecommunication System), and the like. The embodiments of the present invention are described by using an LTE network and/or LTE-A network as an example. However, the embodiments of the present invention are not limited thereto.

It should further be understood that in the embodiments of the present invention, a terminal may also be referred to as a user equipment (UE, User Equipment), a mobile station (MS, Mobile Station), a mobile terminal (Mobile Terminal), or the like. The terminal may communicate with one or more core networks through a radio access network (RAN, Radio Access Network). For example, the terminal may be a mobile phone (which may also be referred to as a "cellular" phone), a computer having a mobile terminal, or the like. For example, the terminal may also be a portable, pocket-sized, handheld, computer built-in, or vehicle-mounted mobile apparatus.

It should further be understood that in the embodiments of the present invention, a base station may be a base station (BTS, Base Transceiver Station) in GSM, a base station (NB, NodeB) in WCDMA, an evolved base station (eNB, or eNodeB, Evolutional Node B) in LTE, or an access point (AP, Access Point), which is not limited in the embodiments of the present invention. However, for the convenience of description, the following embodiments are described by using an eNodeB as an example.

In an LTE system, when being handed over to a neighboring cell of a serving cell (briefly referred to as a neighboring cell), a UE needs to perform measurement on the neighboring cell first, and then reports a measurement result to a base station; and the base station determines whether to perform the handover. The UE performs measurement based on a measurement object configured by the base station for the UE, where the measurement object normally is a frequency (which may also be referred to as a frequency point). In other words, if the base station configures measurement on a frequency, the UE may perform measurement on a neighboring cell that uses this frequency; otherwise, the UE does not measure this frequency, and therefore a neighboring cell that uses this frequency cannot be measured.

In an LTE heterogeneous network, a cell type includes a Macro cell (macro cell), a micro cell (for example, a Pico cell), a cell of a home base station, and the like. Generally, a micro cell covers a smaller area than a cell of a macro base station. The UE cannot distinguish a Macro cell from a Pico cell according to a physical cell identifier (Physical Cell Identifier, PCI), and therefore the Pico cell cannot be measured timely.

In addition, the UE in a connected state may perform measurement frequently. A measurement starting condition is introduced for the purpose of energy saving, so as to prevent the UE from performing measurement too frequently. For example, a preset threshold is configured for a UE in a connected state, and the UE starts measurement on a neighboring cell only when a measured value of a serving cell is smaller than the preset threshold; otherwise, the UE does not perform measurement. In other words, the UE may start measurement on a neighboring micro cell only when signal quality of the serving cell is worse than a specific threshold, which reduces an effect of load sharing of the micro cell.

FIG. 1 is a schematic flowchart of a cell measurement method according to an embodiment of the present invention, which includes the following content:

110. A UE receives information of a neighboring micro cell, and learns that a neighboring cell of a serving cell of the UE includes a micro cell according to the information of the neighboring micro cell.

For example, the information of the neighboring micro cell may be a dedicated information element (IE) of a micro cell, and when receiving the dedicated IE, the UE may identify or learn that a neighboring cell of a serving cell of the UE includes a micro cell. More specifically, the information of the neighboring micro cell may be in a list (list) form, where the list may include a frequency of a micro cell, or include a frequency of a micro cell and an identifier (for example, a PCI) of the micro cell.

120. The UE ignores a measurement starting condition when performing measurement on the micro cell.

In this embodiment, ignoring the measurement starting condition refers to not being limited by the measurement starting condition. For example, the measurement starting condition is invalidated.

As a specific embodiment, if the information of the neighboring micro cell includes a frequency of the micro cell, the UE may ignore the measurement starting condition when measuring the frequency of the micro cell.

Optionally, as another embodiment, if the information of the neighboring micro cell includes an identifier of the micro cell and a frequency of the micro cell, the UE ignores the measurement starting condition when performing measurement on the micro cell corresponding to the identifier of the micro cell. Because the UE can accurately identify a micro cell according to an identifier of the micro cell, the UE can identify more accurately a micro cell for which the measurement starting condition may be ignored and perform measurement on the micro cell.

In the above technical solution according to this embodiment, the UE receives the information of the neighboring micro cell sent by the base station, learns that the neighboring cell of the serving cell of the UE includes the micro cell according to the information of the neighboring micro cell, and ignores the measurement starting condition when performing measurement on the micro cell, so that the UE can timely complete measurement on the neighboring micro cell and be handed over to the neighboring micro cell, thereby improving an effect of load sharing of the micro cell.

As another embodiment of the present invention, the method according to the embodiment described above may further include: obtaining, by the UE, measurement configuration information from a control base station of the serving cell; and if the measurement configuration information does not include measurement configuration information corresponding to the frequency of the micro cell, sending, by the UE, measurement configuration request information to the control base station of the serving cell, where the measurement configuration request information is used to request the control base station to configure the measurement configuration information corresponding to the frequency of the micro cell. Further, the measurement configuration request information may be further used to request the control base station to configure a measurement event corresponding to the frequency of the micro cell.

For example, if the measurement configuration information obtained by the UE from the control base station of the serving cell does not include the measurement configuration information corresponding to the frequency of the micro cell included in the information of the neighboring micro cell, it indicates that the control base station of the serving cell does not configure a measurement on a frequency of the micro cell for the UE. In this case, the UE may send measurement configuration request information to the control base station, so as to request the control base station to configure measurement configuration information corresponding to the frequency of the micro cell. Then, after receiving the measurement configuration information configured by the control base station for the UE and corresponding to the frequency of the micro cell, the UE ignores the measurement starting condition to measure the frequency of the micro cell, and is handed over to the micro cell through the control base station, thereby improving an effect of load sharing of the micro cell. Further, the UE may further request, by using the measurement configuration request information, the control base station to configure the measurement event corresponding to the frequency of the micro cell; the control base station configures the measurement event corresponding to the frequency of the micro cell and delivers the measurement event corresponding to the frequency of the micro cell to the UE; and the UE may ignore the measurement starting condition when performing measurement on the measurement event corresponding to the frequency of the micro cell.

If the measurement configuration information received by the UE from the control base station includes the measurement configuration information corresponding to the frequency of the micro cell, the UE may also send measurement configuration request information to the control base station of the serving cell, where the measurement configuration request information is used to request the control base station to configure the measurement event corresponding to the frequency of the micro cell.

For example, if the control base station of the serving cell of the UE configures a measurement on a frequency for the UE, and the frequency is also included in the information of the neighboring micro cell, that is, the measurement configuration information configured by the control base station includes the measurement configuration information corresponding to the frequency of the micro cell included in the information of the neighboring micro cell, the UE ignores the measurement starting condition when measuring the frequency (that is, the frequency of the micro cell), so that the UE directly measures the frequency of the micro cell when performing measurement on the neighboring cell. In addition, the UE may further send measurement configuration request information to the control base station, where the measurement configuration request information may include the frequency of the micro cell, so as to request the control base station to configure the measurement event for the frequency of the micro cell. The control base station configures the measurement event corresponding to the frequency of the micro cell and delivers the measurement event corresponding to the frequency of the micro cell to the UE; and the UE may ignore the measurement starting condition when performing measurement on the measurement event corresponding to the frequency of the micro cell.

Optionally, as another embodiment, the measurement configuration request information may further include location information of the UE, so that the base station may determine, according to the location information of the UE, whether to configure the measurement configuration information or measurement event corresponding to the frequency of the micro cell.

For example, if finding that the UE is far away from a micro cell that uses a frequency of a micro cell, indicating that a handover to the micro cell is improper, the control base station of the serving cell does not configure the measurement configuration information or measurement event for the frequency of the micro cell. Therefore, the control base station of the serving cell may control the UE to be handed over to a proper micro cell.

The measurement starting condition in this embodiment includes: starting, by the UE, measurement on a neighboring cell of the serving cell only when a measured value of a measurement variable (for example, signal quality) of the serving cell is smaller than a preset threshold. However, the embodiment of the present invention is not limited thereto, and the measurement starting condition may be any other condition limiting the starting of the measurement.

In the above technical solution according to this embodiment, the UE receives the information of the neighboring micro cell sent by the base station, learns that the neighboring cell of the serving cell of the UE includes the micro cell according to the information of the neighboring micro cell, and ignores the measurement starting condition when performing measurement on the micro cell, so that the UE can timely complete measurement on the neighboring micro cell and be handed over to the neighboring micro cell, thereby improving an effect of load sharing of the micro cell.

In addition, in a case where the control base station of the serving cell does not configure a measurement on the micro cell, the UE may also request the control base station to configure measurement configuration information for the frequency of the micro cell, or request the control base station to configure a measurement event corresponding to the frequency of the micro cell, thereby further improving the possibility of the handover of the UE to the micro cell.

The measurement method according to the embodiment of the present invention is described above with reference to FIG. 1 from the point of the UE. The following describes in detail a measurement control method according to an embodiment of the present invention from the point of a base station. The measurement control method includes: sending, by a base station, information of a neighboring micro cell to a user equipment, so that the user equipment learns that a neighboring cell of a serving cell of the user equipment includes a micro cell according to the information of the neighboring micro cell, and the user equipment ignores a measurement starting condition when performing measurement on the micro cell.

Optionally, the information of the neighboring micro cell may include a frequency of the micro cell, or include an identifier of a micro cell and a frequency of the micro cell.

In this embodiment, the base station knows which neighboring cells of the serving cell are micro cells, and also knows information such as the identifier (such as a PCI) of the micro cell and the frequency of the micro cell. The base station may send the information of the neighboring micro cell to the UE by using dedicated signaling or a broadcast message. For example, the information of the neighboring micro cell may be included, as a dedicated information element, in a system message or a measurement control message, and may be in a form of a micro cell list. It should be noted that the present invention is not limited by a manner of notifying the UE of the information of the neighboring micro cell.

In this embodiment, the base station may provide the information of the neighboring micro cell to the UE, so that the UE may learn that the neighboring cell of the serving cell includes the micro cell, and ignore the measurement starting condition when performing measurement on the micro cell, so as to timely complete measurement on the neighboring micro cell and be handed over to the neighboring micro cell to be served, thereby improving an effect of load sharing of the micro cell.

As another embodiment, the method further includes: receiving, by the base station, measurement configuration request information sent by the UE, where the measurement configuration request information is used to request the base station to configure measurement configuration information corresponding to the frequency of the micro cell; and then delivering, by the base station, the measurement configuration information corresponding to the frequency of the micro cell to the UE, so that the UE may ignore the measurement starting condition when measuring the frequency of the micro cell or when performing measurement on the micro cell corresponding to the identifier of the micro cell. Further, the measurement configuration request information may be further used to request the base station to configure a measurement event corresponding to the frequency of the micro cell, and the method further includes: configuring, by the base station, the measurement event corresponding to the frequency of the micro cell according to the measurement configuration request information. For example, after receiving the measurement configuration request information, the base station configures a parameter of the measurement event for the frequency of the micro cell.

As another optional embodiment, the method further includes: receiving, by the base station, measurement configuration request information sent by the UE, where the measurement configuration request information is used to request the base station to configure a measurement event corresponding to the frequency of the micro cell; and configuring, by the base station, the measurement event corresponding to the frequency of the micro cell according to the measurement configuration request information.

As another optional embodiment, the measurement configuration request information in the foregoing embodiments may include location information of the UE, so that the base station may determine, according to the location information of the UE, whether to configure the measurement configuration information or measurement event corresponding to the frequency of the micro cell. For example, if the base station finds that the UE is far away from a micro cell that uses the frequency of the micro cell, indicating that a handover to the micro cell is improper, the base station does not configure the measurement configuration information or measurement event for the frequency of the micro cell, so as to control the UE to be handed over to a proper micro cell.

The measurement starting condition in the foregoing embodiment includes: starting measurement on a neighboring cell of the serving cell only when a measured value of a measurement variable of the serving cell is smaller than a preset threshold.

In this embodiment, the base station may provide the information of the neighboring micro cell to the UE, so that the UE may learn that the neighboring cell of the serving cell includes the micro cell, so as to timely complete measurement on the neighboring micro cell and be handed over to the neighboring micro cell to be served, thereby improving an effect of load sharing of the micro cell. In addition, the UE may request the base station to configure the information or measurement event for the frequency of the micro cell for which no measurement configuration information or measurement event is configured, so that the UE may perform measurement on the micro cell that uses the frequency of the micro cell, thereby further improving the possibility of the handover of the UE to the micro cell.

Figure 2:
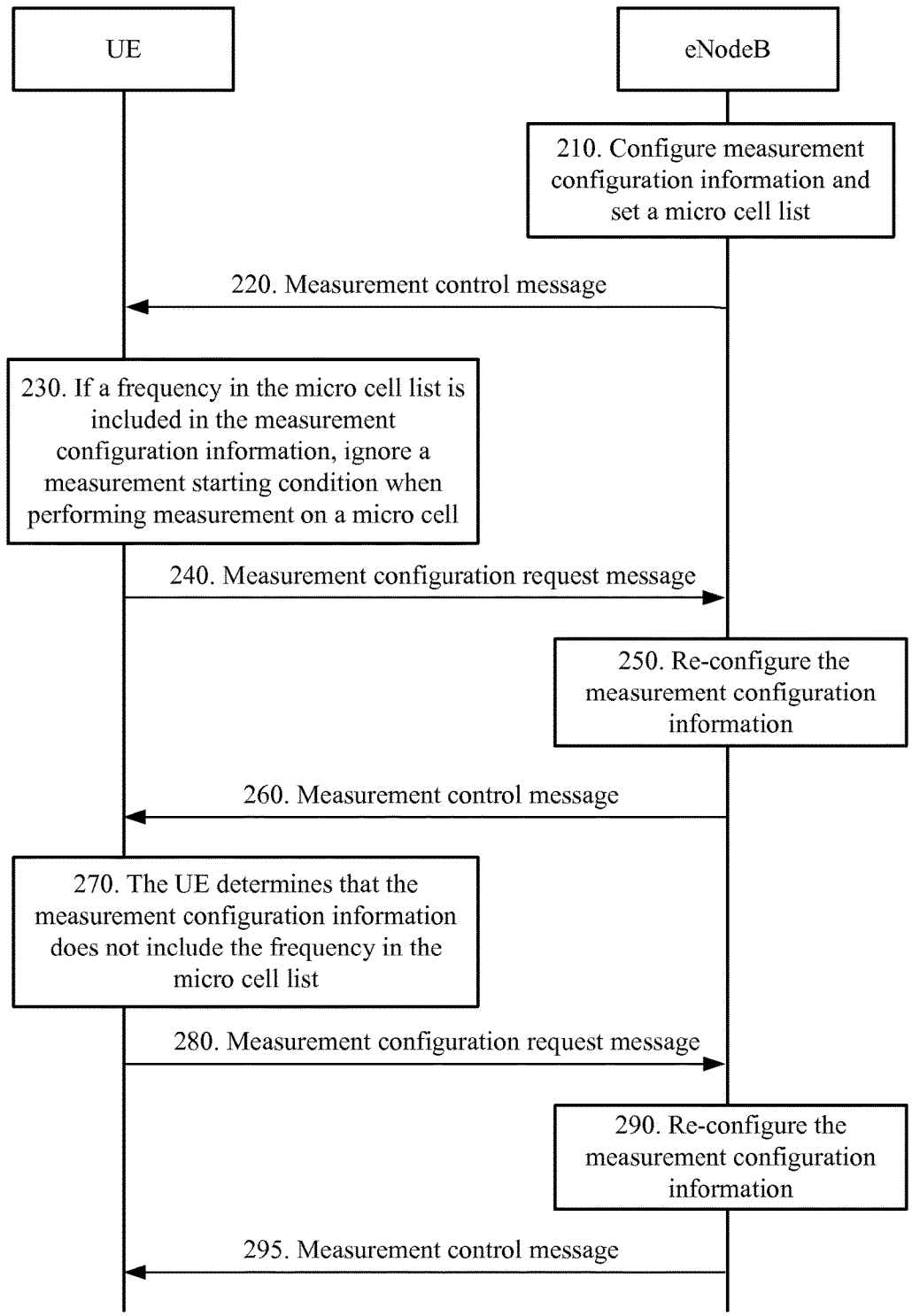
FIG. 2 is a schematic flowchart of a measurement control method according to an embodiment of the present invention.

The embodiment of the present invention is described hereinafter in further detail with reference to a specific example. FIG. 2 is a schematic flowchart of a measurement control method according to an embodiment of the present invention. In FIG. 2, an eNodeB represents a control base station of a current serving cell of a UE. However, the present invention is not limited to a specific format represented by this term, and is applicable to a base station of other similar forms.

210. An eNodeB configures measurement configuration information and sets a micro cell list. The micro cell list may include a frequency of a micro cell, or include a PCI of a micro cell and a frequency of the micro cell. For example, the eNodeB may set the micro cell list in a dedicated information element of a measurement control message (for example, RRCConnectionReconfiguration, RRC connection reconfiguration). The measurement configuration information may include information of a neighboring cell such as a frequency, a measurement identifier, a report manner, and an event parameter.

220. The eNodeB delivers the measurement control message to the UE. The measurement control message may carry the micro cell list, the measurement configuration information, and a measurement starting condition. For example, the eNodeB may send the micro cell list by using dedicated signaling or a broadcast message.

230. If a frequency in the micro cell list is included in the measurement configuration information, that is, the measurement configuration information includes measurement configuration information corresponding to the frequency in the micro cell list, the UE ignores the measurement starting condition when performing measurement on the micro cell. For example, after the UE receives the micro cell list and the measurement configuration information from the eNodeB, the UE may determine, according to whether the frequency in the micro cell list is included in the measurement configuration information, whether to perform measurement on a cell that uses the frequency. For example, if the current measurement configuration information includes the measurement configuration information corresponding to the frequency in the micro cell list, the UE may start measurement on this frequency while ignoring the measurement starting condition.

Optionally, 240 to 260 may be executed after 230. If the frequency in the micro cell list is not included in the measurement configuration information, that is, the measurement configuration information does not include measurement configuration information corresponding to the frequency of the micro cell, 270 to 295 are executed.

240. The UE sends a measurement configuration request information to the eNodeB to request the eNodeB to configure a measurement event for the frequency of the micro cell. For example, the UE may request the eNodeB to configure a measurement event for a frequency, in spite that frequency measurement has been configured in the current measurement configuration information. The UE may use a proximity indication (proximity indication) message to carry the frequency of the micro cell, a requested measurement event, and indication information indicating that the proximity indication message is the measurement configuration request information of the micro cell, so that the eNodeB configures a measurement event for the frequency after receiving the measurement configuration request information.

250. After receiving the measurement configuration request information sent by the UE, the eNodeB re-configures measurement configuration information and configures a measurement event for the frequency of the micro cell. For example, a parameter of the measurement event is configured.

260. The eNodeB delivers the re-configured measurement configuration information to the UE by using a measurement control message.

270. The UE determines that the measurement configuration information does not include the frequency in the micro cell list. For example, the eNodeB does not configure measurement configuration information for a part or all of frequencies in the micro cell list, and the UE finds, by comparing the micro cell list with the measurement configuration information, that a part or all of frequencies in the micro cell list are not included in the measurement configuration information.

280. The UE sends a measurement configuration request information to the eNodeB. For example, if the current measurement configuration has no measurement configuration information corresponding to the frequency of the micro cell, the UE notifies, in the measurement configuration request information, the eNodeB of the frequency needing to be measured by the UE and indication information, where the indication information is used to indicate that the request is a measurement configuration request information for the micro cell, so that after receiving the measurement configuration request information, the eNodeB configures a measurement for the frequency. Optionally, the measurement configuration request information may further be used to request configuration of a measurement event, so that the eNodeB configures a measurement event for the frequency after receiving the measurement configuration request information.

290. After receiving the measurement configuration request information sent by the UE, the eNodeB re-configures measurement configuration information and configures a measurement event for the frequency of the micro cell. For example, the eNodeB may add information of the frequency to the measurement configuration information. In a case where the measurement request further includes the requested measurement event, the eNodeB further configures a parameter of the measurement event.

295. The eNodeB delivers the re-configured measurement configuration information to the UE by using a measurement control message, so that the UE performs measurement according to the re-configured measurement configuration information.

Optionally, in 240 or 270, the measurement configuration request information may further carry current location information of the UE, so that the eNodeB may determine, according to the current location information of the UE, whether to configure the measurement configuration information for the frequency for the UE. For example, if the UE is far away from the micro cell that uses the frequency, the eNodeB does not configure the measurement configuration information for the frequency.

Figure 3:
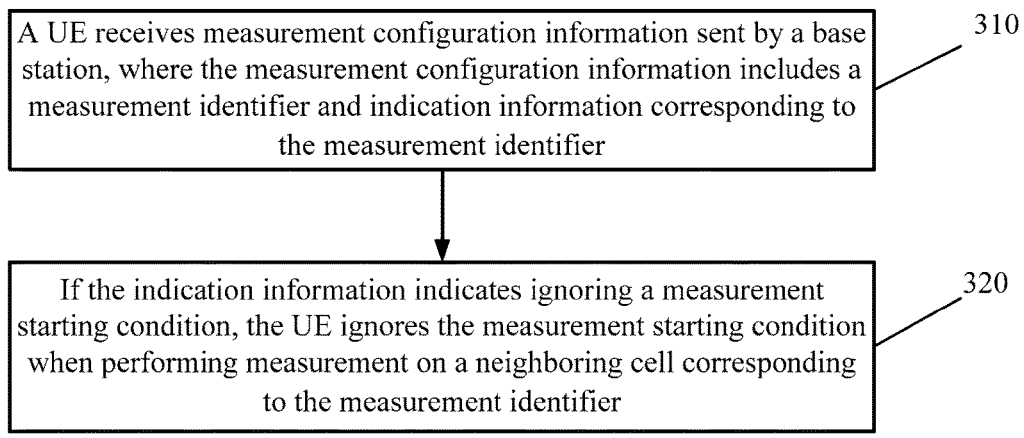
FIG. 3 is a schematic flowchart of a cell measurement method according to an embodiment of the present invention.

FIG. 3 is a schematic flowchart of a cell measurement method according to an embodiment of the present invention, which includes the following content:

310. A UE receives measurement configuration information sent by a base station, where the measurement configuration information includes a measurement identifier and indication information corresponding to the measurement identifier.

In this embodiment, the measurement identifier may be used to identify different measurement, for example, may be used to distinguish different measurement events. The indication information corresponding to the measurement identifier is used to indicate the UE ignoring a measurement starting condition when performing measurement corresponding to the measurement identifier.

320. If the indication information indicates ignoring a measurement starting condition, the UE ignores the measurement starting condition when performing measurement on a neighboring cell corresponding to the measurement identifier.

In this embodiment, the neighboring cell measurement corresponding to the measurement identifier may be measurement on a micro cell, so that the UE may ignore the measurement starting condition when performing measurement on the micro cell corresponding to the measurement identifier.

The measurement starting condition in the embodiment of the present invention includes: starting, by the UE, measurement on a neighboring cell of the serving cell only when a measured value of a measurement variable of the serving cell is smaller than a preset threshold.

In the technical solution according to the embodiment of the present invention, by receiving the indication information for indicating ignoring the measurement starting condition sent by the base station, the UE is allowed to ignore the measurement starting condition only when performing measurement on the neighboring cell corresponding to the measurement identifier, thereby controlling the measurement performed by the UE more accurately.

For example, the base station may configure multiple measurement events for the UE, and the UE may perform measurement on a neighboring cell according to the measurement events configured by the base station. If determining that a result of a measurement event satisfies requirements, the UE reports the result satisfying the measurement event to the serving cell by using a measurement report; and the serving cell determines whether to perform cell handover according to the result of the measurement event. For example, the base station configures corresponding measurement identifiers when configuring the measurement events, so as to distinguish different measurement events.

In the embodiment of the present invention, in order to relieve some measurement events for a neighboring micro cell from the restriction of the measurement starting condition, when configuring a measurement event related to a micro cell for the UE, the base station may use the indication information to indicate that some measurement events that are indicated by the measurement identifiers and related to the micro cell are not limited by the measurement starting condition. The measurement starting condition may be starting, by the UE, measurement on the neighboring cell only when a measured value of the serving cell is smaller than a preset threshold. After receiving the measurement configuration information including the indication information, the UE ignores the measurement starting condition when performing measurement on the neighboring cell according to the measurement event.

Figure 4:
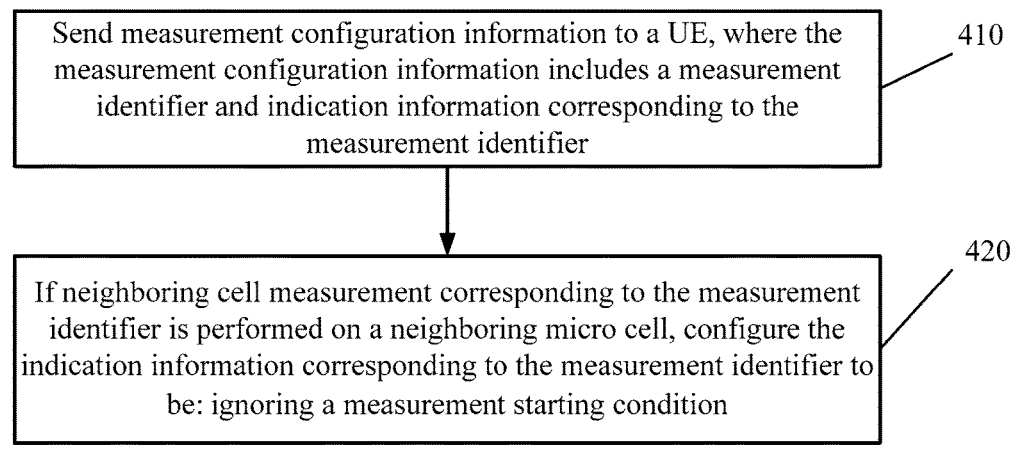
FIG. 4 is a schematic flowchart of a measurement control method according to an embodiment of the present invention.

FIG. 4 is a schematic flowchart of a measurement control method according to an embodiment of the present invention. The method in FIG. 4 is executed by a base station, which is corresponding to the method in FIG. 3.

410. Send measurement configuration information to a UE, where the measurement configuration information includes a measurement identifier and indication information corresponding to the measurement identifier.

420. If neighboring cell measurement corresponding to the measurement identifier is performed on a neighboring micro cell, configure the indication information corresponding to the measurement identifier to be: ignoring a measurement starting condition.

The measurement starting condition in this embodiment includes: starting, by the UE, measurement on a neighboring cell of the serving cell only when a measured value of a measurement variable of the serving cell is smaller than a preset threshold.

In the embodiment of the present invention, the base station may provide to the UE the indication information for indicating ignoring the measurement starting condition, so that the UE is allowed to ignore the measurement starting condition only when performing measurement on the neighboring cell corresponding to the measurement identifier, thereby controlling the measurement performed by the UE more accurately.

Figure 5:
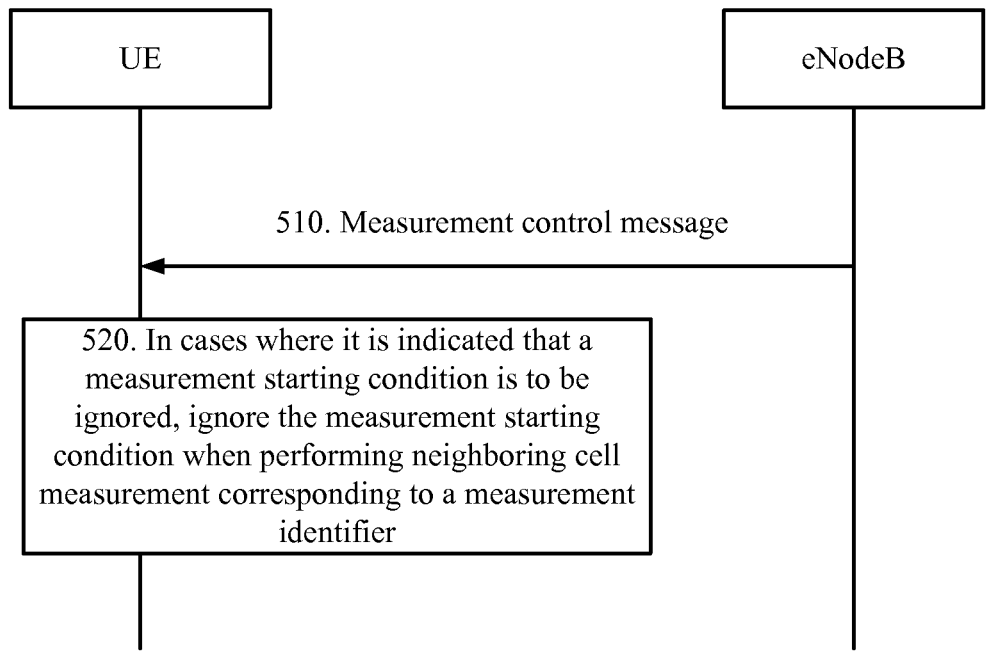
FIG. 5 is a schematic flowchart of a measurement control method according to an embodiment of the present invention.

The embodiment of the present invention is described hereinafter in further detail with reference to a specific example. FIG. 5 is a schematic flowchart of a measurement control method according to an embodiment of the present invention. In FIG. 5, an eNodeB represents a control base station of a current serving cell of a UE. However, the present invention is not limited to a specific format represented by this term, and is applicable to a base station of other similar forms.

510. An eNodeB sends a measurement control message to a UE, where the measurement control message may carry measurement configuration information and a measurement starting condition, and the measurement configuration information includes a measurement identifier and indication information corresponding to the measurement identifier, where the indication information is used to indicate ignoring the measurement starting condition. For example, in a case where neighboring cell measurement corresponding to the measurement identifier is performed on a neighboring micro cell, the indication information corresponding to the measurement identifier is configured to be: ignoring the measurement starting condition. For example, the eNodeB may configure a measurement event in an information element of an RRC connection reconfiguration (RRCConnectionReconfiguration) message, and configure a corresponding measurement identifier when configuring the measurement event, to distinguish a different measurement event. The eNodeB knows which neighboring cells are micro cells and knows information, such as a PCI and a frequency, of the micro cell; therefore, the eNodeB configures indication information corresponding to the measurement identifier while configuring the measurement event related to the micro cell for the UE. For example, the eNodeB may indicate, by using a flag in a radio resource management configuration (RRM-config) information element of the RRCConnectionReconfiguration message, ignoring the measurement starting condition when performing some measurement events indicated by the measurement identifier (measurement id), or to invalidate the measurement starting condition for these measurement events. The limit of the measurement starting condition is default. For example, existence of the flag indicates ignoring the measurement starting condition, and if the flat is left empty, it indicates that the limit of the measurement starting condition should be followed.

520. In a case where it is indicated that the measurement starting condition is to be ignored, ignore the measurement starting condition when performing neighboring cell measurement corresponding to the measurement identifier. For example, if the measurement events corresponding to the measurement identifiers are measurement events related to a micro cell, the UE ignores the measurement starting condition when performing measurement according to the measurement event corresponding to the measurement identifier and related to the micro cell.

The methods for cell measurement and measurement control according to the embodiments of the present invention are described above. The following describes devices for cell measurement and measurement control according to the embodiments of the present invention with reference to FIG. 6 to FIG. 11.

Figure 6:
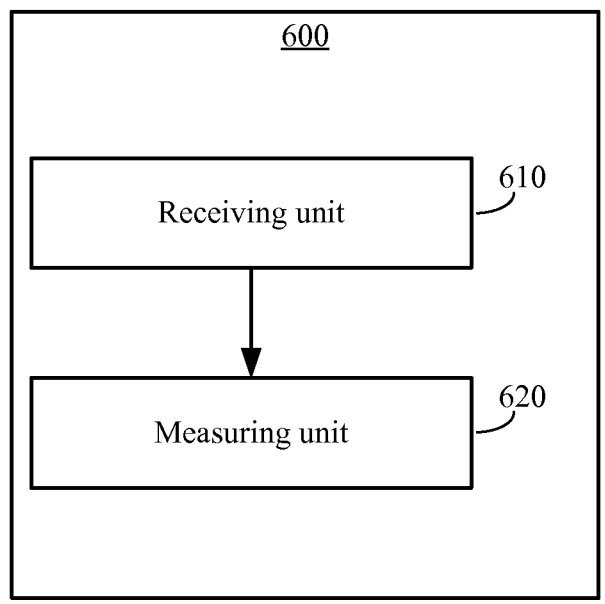
FIG. 6 is a schematic structural diagram of a user equipment according to an embodiment of the present invention.

FIG. 6 is a schematic structural diagram of a UE according to an embodiment of the present invention. A UE 600 in FIG. 6 includes a receiving unit 610 and a measuring unit 620.

The receiving unit 610 is configured to receive information of a neighboring micro cell, and learn that a neighboring cell of a serving cell of the UE includes a micro cell according to the information of the neighboring micro cell. The measuring unit 620 is configured to ignore a measurement starting condition when performing measurement on the micro cell.

Optionally, the information of the neighboring micro cell may include a frequency of the micro cell, and the measuring unit 620 is further configured to ignore the measurement starting condition when performing measurement on the frequency of the micro cell.

Optionally, the information of the neighboring micro cell may include a frequency of the micro cell and an identifier of the micro cell, and the measuring unit 620 is further configured to ignore the measurement starting condition when performing measurement on the micro cell corresponding to the identifier of the micro cell.

Reference may be made to 110 and 120 of the method in FIG. 1 for the operations and functions of the receiving unit 610 and the measuring unit 620 of the UE 600, which are not described repeatedly herein for avoiding repetition.

The UE according to this embodiment receives the information of the neighboring micro cell sent by the base station, learns that the neighboring cell of the serving cell of the UE includes the micro cell according to the information of the neighboring micro cell, and ignores the measurement starting condition when performing measurement on the micro cell, so that the UE can timely complete measurement on the neighboring micro cell and be handed over to the neighboring micro cell, thereby improving an effect of load sharing of the micro cell.

Figure 7:
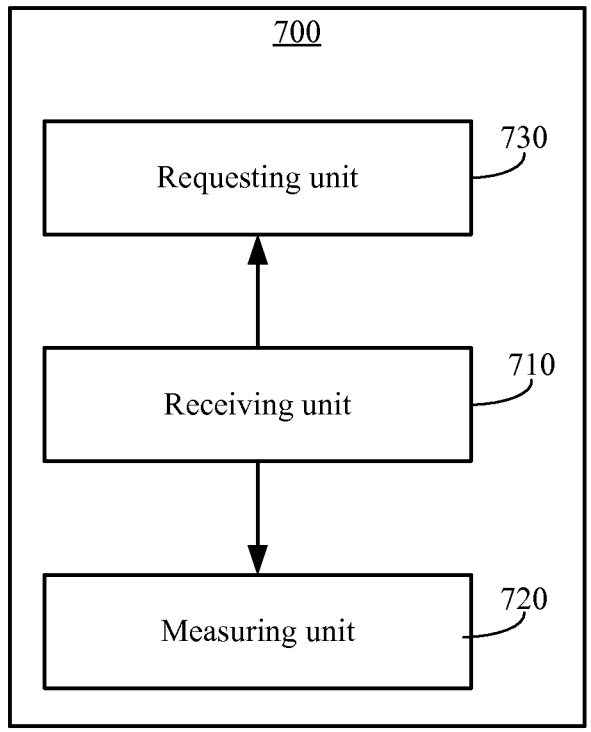
FIG. 7 is a schematic structural diagram of a user equipment according to an embodiment of the present invention.

FIG. 7 is a schematic structural diagram of a UE according to an embodiment of the present invention. A UE 700 in FIG. 7 includes a receiving unit 710, a measuring unit 720, and a requesting unit 730. The receiving unit 710 and the measuring unit 720 in FIG. 7 are similar to the receiving unit 610 and the measuring unit 620 in FIG. 6, which are not described repeatedly herein for avoiding repetition.

As an optional embodiment, the receiving unit 710 may further obtain measurement configuration information from a control base station of a serving cell; when the measurement configuration information does not include measurement configuration information corresponding to a frequency of a micro cell, the requesting unit 730 sends measurement configuration request information to the control base station of the serving cell, where the measurement configuration request information is used to request the control base station to configure the measurement configuration information corresponding to the frequency of the micro cell. Optionally, the measurement configuration request information may be further used to request the control base station to configure a measurement event corresponding to the frequency of the micro cell.

As another optional embodiment, the receiving unit 710 may further obtain measurement configuration information from a control base station of a serving cell; when the measurement configuration information includes measurement configuration information corresponding to a frequency of a micro cell, the requesting unit 730 sends measurement configuration request information to the control base station of the serving cell, where the measurement configuration request information is used to request the control base station to configure a measurement event corresponding to the frequency of the micro cell.

Optionally, in the foregoing embodiments, the measurement configuration request information may further include location information of the UE.

The measurement starting condition in this embodiment may include: starting measurement on a neighboring cell of the serving cell only when a measured value of a measurement variable of the serving cell is smaller than a preset threshold.

Reference may be made to the method in FIG. 1 for the operations and functions of the receiving unit 710, the measuring unit 720, and the requesting unit 730 of the UE 700, which are not described repeatedly herein for avoiding repetition.

The UE according to this embodiment receives the information of the neighboring micro cell sent by the base station, learns that the neighboring cell of the serving cell of the UE includes the micro cell according to the information of the neighboring micro cell, and ignores the measurement starting condition when performing measurement on the micro cell, so that the UE can timely complete measurement on the neighboring micro cell and be handed over to the neighboring micro cell, thereby improving an effect of load sharing of the micro cell. In addition, in a case where the control base station of the serving cell does not configure a measurement on the micro cell, the UE may also request the control base station to configure measurement configuration information for the frequency of the micro cell, or request the control base station to configure a measurement event corresponding to the frequency of the micro cell, thereby further improving the possibility of the handover of the UE to the micro cell.

Figure 8:
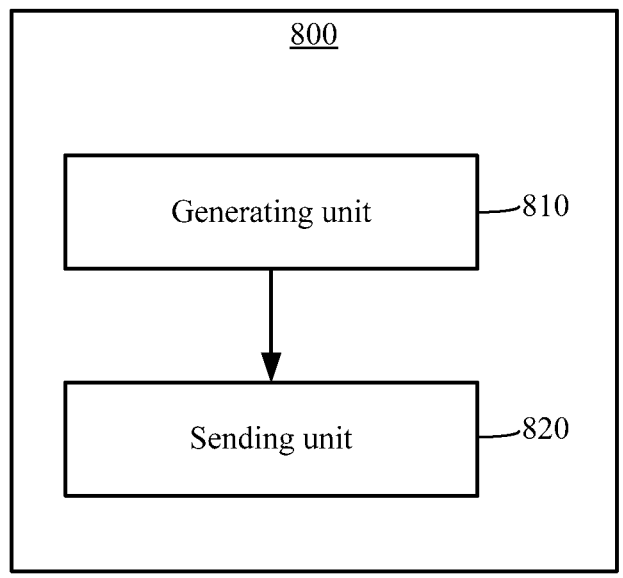
FIG. 8 is a schematic structural diagram of a base station according to an embodiment of the present invention.

FIG. 8 is a schematic structural diagram of a base station according to an embodiment of the present invention. A base station 800 in FIG. 8 includes a generating unit 810 and sending unit 820.

The generating unit is configured to generate information of a neighboring micro cell. The sending unit 820 is configured to send the information of the neighboring micro cell to the UE, so that the UE learns that a neighboring cell of a serving cell of the UE includes a micro cell according to the information of the neighboring micro cell, and the UE ignores a measurement starting condition when performing measurement on the micro cell.

According to the embodiment of the present invention, the information of the neighboring micro cell may include a frequency of the micro cell, or include an identifier of the micro cell and the frequency of the micro cell.

The base station according to the embodiment of the present invention may provide the information of the neighboring micro cell to the UE, so that the UE may identify that the neighboring cell of the serving cell includes the micro cell, so as to timely complete measurement on the neighboring micro cell and be handed over to the neighboring micro cell to be served, thereby improving an effect of load sharing of the micro cell.

Reference may be made to the base station-side method embodiment corresponding to FIG. 1 for the operations and functions of the units in the base station 800, which are not described repeatedly herein for avoiding repetition.

Figure 9:
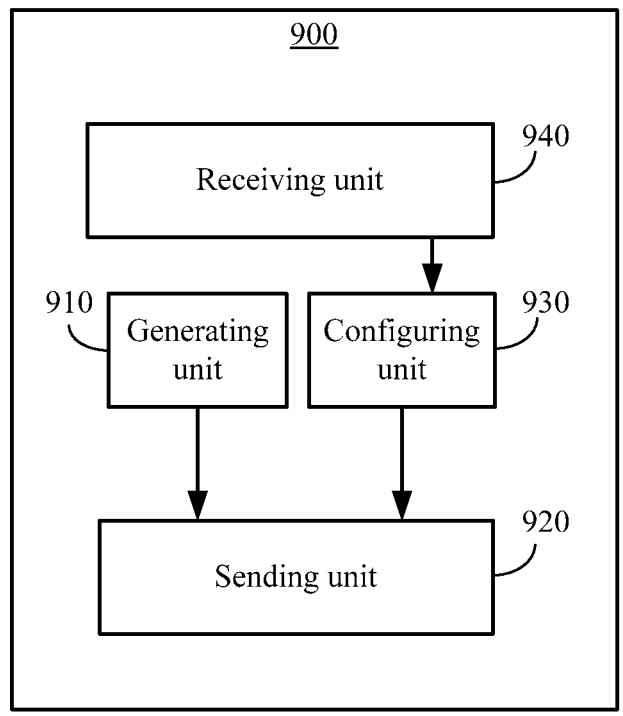
FIG. 9 is a schematic structural diagram of a base station according to an embodiment of the present invention.

FIG. 9 is a schematic structural diagram of a base station according to an embodiment of the present invention. A base station 900 in FIG. 9 includes a configuring unit 930, a generating unit 910, a sending unit 920, and a receiving unit 940. The generating unit 910 and the sending unit 920 in FIG. 9 are similar to the generating unit 810 and the sending unit 820 in FIG. 8, which are not described repeatedly herein for avoiding repetition.

The receiving unit 940 receives measurement configuration request information sent by a UE. The configuring unit 930 configures measurement configuration information corresponding to a frequency of a micro cell according to the measurement configuration request information, where the measurement configuration request information is used to request the configuring unit to configure the measurement configuration information corresponding to the frequency of the micro cell. Further, the measurement configuration request information may be further used to request the configuring unit 930 to configure a measurement event corresponding to the frequency of the micro cell, and the configuring unit 930 may configure the measurement event corresponding to the frequency of the micro cell according to the measurement configuration request information.

Optionally, as another embodiment, the receiving unit 940 may further receive measurement configuration request information sent by the UE, where the measurement configuration request information is used to request the configuring unit 930 to configure a measurement event corresponding to the frequency of the micro cell. The configuring unit 930 further configures the measurement event corresponding to the frequency of the micro cell according to the measurement configuration request information.

According to another embodiment of the present invention, the measurement event configuration request information includes location information of the UE. The configuring unit 930 further determines, according to the location information of the UE, whether to configure the measurement configuration information or measurement event corresponding to the frequency of the micro cell.

The measurement starting condition in this embodiment may include: starting measurement on a neighboring cell of the serving cell only when a measured value of a measurement variable of the serving cell is smaller than a preset threshold.

The base station according to the embodiment of the present invention may provide the information of the neighboring micro cell to the UE, so that the UE may identify that the neighboring cell of the serving cell includes the micro cell, and ignore the measurement starting condition when performing measurement on the micro cell, so as to timely complete measurement on the neighboring micro cell and be handed over to the neighboring micro cell to be served, thereby improving an effect of load sharing of the micro cell. In addition, the base station may configure the measurement configuration information or measurement event corresponding to the frequency of the micro cell according to the request of the UE, thereby further improving the possibility of the handover of the UE to the micro cell.

Reference may be made to the base station-side method embodiment corresponding to FIG. 1 for the operations and functions of the units in the base station 900, which are not described repeatedly herein for avoiding repetition.

Figure 10:
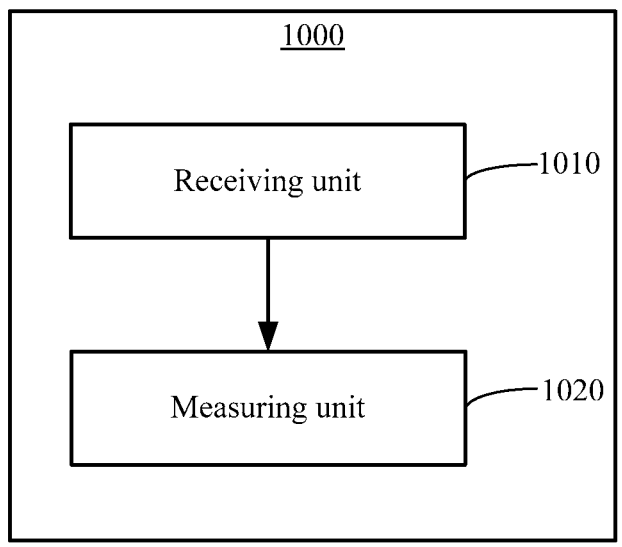
FIG. 10 is a schematic structural diagram of a user equipment according to an embodiment of the present invention.

FIG. 10 is a schematic structural diagram of a UE according to an embodiment of the present invention. A UE 1000 in FIG. 10 includes a receiving unit 1010 and a measuring unit 1020.

The receiving unit 1010 receives measurement configuration information sent by a base station, where the measurement configuration information includes a measurement identifier and indication information corresponding to the measurement identifier. In a case where the indication information indicates ignoring a measurement starting condition, the measuring unit 1020 ignores the measurement starting condition when performing measurement on a neighboring cell corresponding to the measurement identifier.

According to the embodiment of the present invention, the measurement starting condition may include: starting measurement on a neighboring cell of a serving cell only when a measured value of a measurement variable of the serving cell is smaller than a preset threshold.

The UE according to the embodiment of the present invention may receive from the control base station indication information indicating ignoring the measurement starting condition, so that the UE is allowed to ignore the measurement starting condition only when performing measurement on the neighboring cell corresponding to the measurement identifier, thereby controlling the measurement performed by the UE more accurately.

Reference may be made to 310 and 320 of the method in FIG. 3 for the operations and functions of the units of the UE 1000, which are not described repeatedly herein for avoiding repetition.

Figure 11:
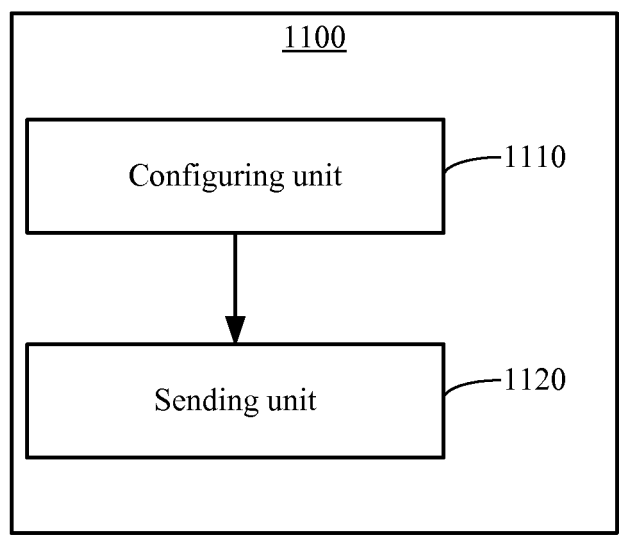
FIG. 11 is a schematic structural diagram of a base station according to an embodiment of the present invention.

FIG. 11 is a schematic structural diagram of a base station according to an embodiment of the present invention. A base station 1100 in FIG. 11 includes a configuring unit 1110 and a sending unit 1120.

When neighboring cell measurement corresponding to a measurement identifier is performed on a neighboring micro cell, the configuring unit 1110 configures indication information corresponding to the measurement identifier to be: ignoring a measurement starting condition. The sending unit 1120 sends measurement configuration information to a UE, where the measurement configuration information includes the measurement identifier and the indication information corresponding to the measurement identifier.

According to the embodiment of the present invention, the measurement starting condition may include: starting measurement on a neighboring cell of a serving cell only when a measured value of a measurement variable of the serving cell is smaller than a preset threshold.

The base station according to the embodiment of the present invention may provide to the UE the indication information for indicating ignoring the measurement starting condition, so that the UE is allowed to ignore the measurement starting condition only when performing measurement on the neighboring cell corresponding to the measurement identifier, thereby controlling more accurately the measurement performed by the UE.

Reference may be made to 410 and 420 of the method in FIG. 4 for the operations and functions of the units of the base station 1100, which are not described repeatedly herein for avoiding repetition.

An embodiment of the present invention further provides a communication system, which may include the user equipment and the base station according to the embodiments described above.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on the particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and the details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected to achieve the objective of the solution of the embodiment according to actual needs.

In addition, functional units in the embodiments of the present invention may be integrated into one processing unit, or each of the units may exist alone physically, or two or more units may be integrated into one unit. The integrated units may be implemented in a form of hardware, or may be implemented in a form of a software functional unit.

When the integrated units are implemented in a form of a software functional unit and sold or used as an independent product, the integrated units may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes: any medium that may store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the appended claims.

What is claimed is:

1. A measuring method, performed by a user equipment, wherein the user equipment is configured by a control base station of a serving cell of the user equipment to perform a measurement on a neighboring cell of the serving cell when a measurement starting condition is met, and the measurement starting condition comprises starting the measurement on the neighboring cell of the serving cell when a measured value of a measurement variable of the serving cell is lower than a preset threshold, comprising:
   receiving, by the user equipment, information of a neighboring micro cell from the control base station;
   learning, by the user equipment, that neighboring cells of the serving cell of the user equipment comprise a micro cell according to the information of the neighboring micro cell;
   ignoring, by the user equipment, the measurement starting condition to perform a measurement on the micro cell when learning the neighboring cells of the serving cell comprise the micro cell; and
   performing, by the user equipment, the measurement on the micro cell even though the measured value of the measurement variable of the serving cell is not lower than the preset threshold that is the measurement starting condition is not met when learning the neighboring cells of the serving cell comprises the micro cell.

2. The method according to claim 1, wherein the information of the neighboring micro cell comprises a frequency of the micro cell, and the ignoring, by the user equipment, the measurement starting condition to perform the measurement on the micro cell comprises:
   ignoring, by the user equipment, the measurement starting condition to perform the measurement on the frequency of the micro cell.

3. The method according to claim 2, further comprising:
   obtaining, by the user equipment, measurement configuration information from the control base station of the serving cell; and
   sending, by the user equipment when the measurement configuration information does not comprise measurement configuration information corresponding to the frequency of the micro cell, measurement configuration request information to the control base station of the serving cell, wherein the measurement configuration request information is used to request the measurement configuration information corresponding to the frequency of the micro cell.

4. The method according to claim 3, wherein when the measurement configuration information does not comprise the measurement configuration information corresponding to the frequency of the micro cell, the measurement configuration request information is further used to request a measurement event corresponding to the frequency of the micro cell.

5. The method according to claim 3, wherein the measurement configuration request information further comprises location information of the user equipment.

6. The method according to claim 2, further comprising:
   obtaining, by the user equipment, measurement configuration information from a control base station of the serving cell; and
   when the measurement configuration information comprises measurement configuration information corresponding to the frequency of the micro cell, sending, by the user equipment, measurement configuration request information to the control base station of the serving cell, wherein the measurement configuration request information is used to request a measurement event corresponding to the frequency of the micro cell.

7. The method according to claim 1, wherein the information of the neighboring micro cell further comprises an identifier of the micro cell, and the ignoring, by the user equipment, the measurement starting condition to perform the measurement on the micro cell comprises:
ignoring, by the user equipment, the measurement starting condition to perform the measurement on the micro cell corresponding to the identifier of the micro cell.

8. A user equipment, comprising a processor and a non-transitory computer readable storage medium, wherein the user equipment is configured by a control base station of a serving cell of the user equipment to perform a measurement on a neighboring cell of the serving cell when a measurement starting condition is met, the measurement starting condition comprises starting the measurement on the neighboring cell of the serving cell when a measured value of a measurement variable of the serving cell is lower than a preset threshold, and the non-transitory computer readable storage medium comprises a program stored therein, and when the program runs, the following steps are performed:
receiving information of a neighboring micro cell from the control base station;
learning that neighboring cells of the serving cell of the user equipment comprise a micro cell according to the information of the neighboring micro cell;
ignoring the measurement starting condition to perform a measurement on the micro cell when learning the neighboring cells of the serving cell comprise the micro cell; and
performing the measurement on the micro cell even though the measured value of the measurement variable of the serving cell is not lower than the preset threshold that is the measurement starting condition is not met when learning the neighboring cells of the serving cell comprises the micro cell.

9. The user equipment according to claim 8, wherein when the information of the neighboring micro cell comprises a frequency of the micro cell, the measurement starting condition is ignored to perform the measurement on the frequency of the micro cell.

10. The user equipment according to claim 9, wherein when the program runs, the following steps are further performed:
obtaining measurement configuration information from the control base station of the serving cell; and
sending measurement configuration request information to the control base station of the serving cell, when the measurement configuration information does not comprise measurement configuration information corresponding to the frequency of the micro cell, wherein the measurement configuration request information is used to request the measurement configuration information corresponding to the frequency of the micro cell.

11. The user equipment according to claim 10, wherein when the measurement configuration information does not comprise the measurement configuration information corresponding to the frequency of the micro cell, the measurement configuration request information is further used to request a measurement event corresponding to the frequency of the micro cell.

12. The user equipment according to claim 10, wherein the measurement configuration request information further comprises location information of the user equipment.

13. The user equipment according to claim 9, wherein when the program runs, the following steps are performed:
obtaining measurement configuration information from a control base station of the serving cell; and
sending measurement configuration request information to the control base station of the serving cell, when the measurement configuration information comprises measurement configuration information corresponding to the frequency of the micro cell, wherein the measurement configuration request information is used to request a measurement event corresponding to the frequency of the micro cell.

14. The user equipment according to claim 8, wherein the information of the neighboring micro cell comprises an identifier of the micro cell, and when the program runs, the following step is further performed:
ignoring the measurement starting condition when performing a measurement on the micro cell corresponding to the identifier of the micro cell.

15. A base station, comprising a processor and a non-transitory computer readable storage medium, wherein the non-transitory computer readable storage medium comprises a program stored therein, and when the program runs, the following steps are performed:
generating information of a neighboring micro cell; and
sending the information of the neighboring micro cell to a user equipment, so that the user equipment learns that neighboring cells of a serving cell of the user equipment comprise a micro cell according to the information of the neighboring micro cell, and the user equipment ignores a measurement starting condition to perform a measurement on the micro cell when learning the neighboring cells of the serving cell comprise the micro cell, wherein the measurement starting condition is configured by a control base station of the serving cell for the user equipment to perform a measurement on a neighboring cell of the serving cell when the measurement starting condition is met, wherein the measurement starting condition comprises starting a measurement on the neighboring cell of the serving cell when a measured value of a measurement variable of the serving cell is lower than a preset threshold, and wherein upon learning the neighboring cells of the serving cell comprise the micro cell the user equipment is configured to perform the measurement on the micro cell even though the measured value of the measurement variable of the serving cell is not lower than the preset threshold that is the measurement starting condition is not met when learning the neighboring cells of the serving cell comprises the micro cell.

16. The base station according to claim 15, wherein the information of the neighboring micro cell comprises a frequency of the micro cell, or comprises an identifier of the micro cell and the frequency of the micro cell.

17. The base station according to claim 16, wherein when the program runs, the following steps are further performed:
receiving measurement configuration request information sent by the user equipment, wherein the measurement configuration request information is used to request measurement configuration information corresponding to the frequency of the micro cell; and
configuring the measurement configuration information corresponding to the frequency of the micro cell according to the measurement configuration request information.

18. The base station according to claim 17, wherein the measurement configuration request information is further used to request a measurement event corresponding to the frequency of the micro cell; and when the program runs, the following step is further performed:

configuring the measurement event corresponding to the frequency of the micro cell according to the measurement configuration request information.

19. The base station according to claim 17, wherein the measurement configuration request information further comprises location information of the user equipment; and when the program runs, the following step is further performed:

determining, according to the location information of the user equipment, whether to configure the measurement configuration information corresponding to the frequency of the micro cell.

20. The base station according to claim 16, wherein when the program runs, the following step is further performed:

receiving measurement configuration request information sent by the user equipment, wherein the measurement configuration request information is used to request a measurement event corresponding to the frequency of the micro cell; and configuring the measurement event corresponding to the frequency of the micro cell according to the measurement configuration request information.

21. The base station according to claim 20, wherein the measurement configuration request information comprises location information of the user equipment; and when the program runs, the following step is further performed:

determining, according to the location information of the user equipment, whether to configure the measurement event corresponding to the frequency of the micro cell.

* * * * *